United States Patent Office 3,467,731
Patented Sept. 16, 1969

3,467,731
VINYL COATING COMPOSITIONS OF POLYVINYL CHLORIDE OF 2,2-DIMETHYL-1,3-PROPANEDIOL MONO(HYDROXYPIVALATE)
John Wynstra, Somerville, N.J., assignor to Union Carbide Corporation, a corporation of New York
No Drawing. Filed Apr. 11, 1967, Ser. No. 629,888
Int. Cl. C08g 41/04
U.S. Cl. 260—859   17 Claims

ABSTRACT OF THE DISCLOSURE

Vinyl compositions suitable for industrial coating applications have been formulated from blends of about 90 to 60 percent by weight of an isocyanate terminated oligomer with 10 to 40 percent by weight of a vinyl chloride polymer. The oligomer is a condensation product of an ester-diol having the formula

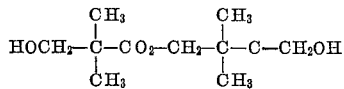

with either a diisocyanate or an organic dibasic acid and a diisocyanate.

---

This invention relates to vinyl coating compositions, and more particularly to vinyl chloride resins combined with oligomer condensation products of ester-diols with diisocyanates and dibasic acids.

Industrial coatings having outstanding toughness and durability have been formulated in the past from vinyl chloride resins. Because of their high molecular weight, these vinyl chloride resins require rather large amounts of expensive solvents to form solutions. The solutions tend to be viscous even at low solids contents. As a result, these solutions are difficult to apply as coatings and several coats are required to build up a practical film thickness. The vinyl chloride resins also tend to be poorly compatible with other film forming materials so that the aforementioned problems are not readily solvable by modifying the vinyl resins with other polymers. Although certain terpolymer vinyl resin compositions, such as a partially hydrolyzed vinyl chloride/vinyl acetate copolymer, are somewhat more compatible with other film-forming materials than vinyl chloride homopolymers or copolymers, the degree of improved compatibility is still limited and leaves much room for improvement. Thus, the limited compatibility of vinyl resins runs counter to the desire of coating formulators to blend and modify coating polymers to meet specific end use requirements.

It is an object of this invention to provide an air-drying coating composition having the initial drying character of a lacquer.

It is another object of this invention to provide an air-drying composition which after the initial air-drying stage cures to a solvent insoluble coating.

Another object is to provide a coating composition which after air-drying cures through a siccative or moisture curing mechanism to an insoluble coating.

Other objects will be apparent to those skilled in the art upon a further reading of the specification which follows.

The above objects have been achieved by blending from about 10 to 40 percent by weight of a vinyl chloride copolymer (solid) with about 90 to 60 percent by weight of an oligomer, said oligomer being a condensation polymer of either an ester diol with a diisocyanate or an ester diol with an organic dibasic acid and this condensation polymer further reacted with a diisocyanate. The preferred coating compositions contain about 70 to 80 percent by weight of oligomer to 30 to 20 percent by weight of vinyl chloride polymer. In the case of the ester diol/diisocyanate reaction product, the mole ratio of the former to the latter is about 1/2 to 14/15. In the case of the ester diol/dibasic acids/diisocyanate reaction product, the mole ratio is about 2/1/2 to 14/7/8.

The term "ester diol" is used to denote a compound having the formula

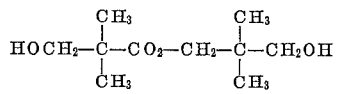

This "ester diol" can be prepared according to methods described in U.S. 2,811,562 and U.S. 3,057,911.

Illustrative of the diisocyanates useful in this invention are the following: bis(2-cyanatoethyl)carbonate (CDI), bis(2-cyanatoethyl) - 4 - cyclohexene - 1,2-dicarboxylate (CEDI), bis(2 - cyanatoethyl)fumarate (FDI), bis(2-isocyanatoethyl)-1,4,5,6,7,7-hexachloro - 5 - norborneno-2,3-dicarboxylate (HEDI), methylene bis(4-phenyl isocyanate) (MDI), bis(2-isocyanatoethyl) - 5-norbornene-2,3-dicarboxylate (NEDI) and 2,4 - tolylenediisocyanate (TDI).

As examples of other suitable polyisocyanates which are employed herein can be mentioned 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3 - isocyanatopropyl)sulfide, 1,7-diisocyanatoheptane, 1,5-diisocyanato-2,2-dimethylpentane, 1,6-diisocyanato - 3 - methoxyhexane, 1,8-diisocyanatooctane, 1,5-diisocyanato - 2,2, 4-trimethylpentane, 1,9-diisocyanatononane, 1,10-diisocyanatodecane, 1,6-diisocyanato - 3 - butoxyhexane, the bis (3-isocyanatopropyl)ether of 1,4-butyleneglycol, 1,11-diisocyanatoundecane, 1,12 - diisocyanatododecane, bis(isocyanatohexyl)-sulfide, 1,4-diisocyanatobenzene, 2,4-diisocyanato - 1 - chlorobenzene, 2,4-diisocyanato-1-nitrobenzene, 2,5-diisocyanato-1-nitrobenzene, 3,6-diisocyanato-1, 4 - dichlorobenzene, 2,5-diisocyanato-1-chloro-4-methoxybenzene, 2,5-diisocyanato-1-methoxybenzene, 2,4 - diisocyanato-1-methoxybenzene, 2, 5-diisocyanato-1-methyl-4-methoxybenzene, 2,4-diisocyanato-1-ethylbenzene, 2,4-diisocyanato-1-ethoxybenzene, 4,6-diisocyanato-1,3 - dimethoxybenzene, 2,5 - diisocyanato - 1,4-dimethoxybenzene, 2, 4-diisocyanato - 1 - propylbenzene, 2,5-diisocyanato-1-propylbenzene, 2,4 - diisocyanato - 1 - isobutylbenzene, 2,4-diisocyanato - 1 - isobutoxybenzene, 2,5 - diisocyanato-1,4-diethoxybenzene, 1,3 - diisocyanatocyclohexane, 1,4-diisocyanatocyclohexane, 1,4 - diisocyanatonaphthalene, 1,5-diisocyanatonaphthalene, 2,6-diisocyanatonaphthalene, 2,7-diisocyanatonaphthalene, 1-(isocyanatomethyl) - 2-(3-isocyanatopropyl) - 3,5 - dimethylcyclohexane, 1,3-bis(4-isocyanato) - propane, α,β-bis(2 - isocyanatoethyl)-9,10-endoethylene dihydroanthracene, 2,4-diisocyanato - 1 - methylcyclohexane, 2,4-diisocyanato - 1 - ethylecyclohexane, bis(4-isocyanatocyclohexyl)methane, 1,1 - bis(4 - isocyanatocyclohexyl)ethane, 2,2 - bis(4 - isocyanatocyclohexyl)propane, bis(2 - methyl - 4 - isocyanatohexyl)methane, bis(3,5 - dimethyl - 4 - isocyanatohexyl)methane, 1-isocyanatomethyl - 4 - isocyanatobenzene, 1-(2-isocyanatoethyl)-4-isocyanatobenzene, 1-(2-isocyanatoethyl)-3 - isocyanatobenzene, 1-(3 - isocyanatopropyl)-4 - isocyanatobenzene, 1 - (4 - isocyanatobutyl) - 4 - isocyanatobenzene, 1,5 - diisocyanatotetrahyronaphthalene, 4,4'-diisocyanatoazobenzene, 2-methyl-4,4'-diisocyanatoazobenzene, 4,4'-diisocyanato - 1 - naphthaleneazobenzene, 2,4-diisocyanatodiphenylether, dianisidene diisocyanate, ethylene glycol bis(4-isocyanatophenyl)ether, diethylene glycol bis(4-isocyanatophenyl)ether, 2,2'-diisocyanatobiphenyl, 2,4-diisocyanatobiphenyl, 4,4 - diisocyanatobiphenyl, 3,3'-dimethoxy - 4,4' - diisocyanatobiphenyl, 3,3'-dimethyl-4,4'-diisocyanatobiphenyl, 3,3' dimethyl - 4,4'-diisocyanatobiphenyl, 2-nitro - 4,4' - diisocyanatobiphenyl, bis(4 - isocyanatophenyl)methane, bis(2 - methyl - 4 - isocyanatophenyl)methane, 2,2-bis(4 - isocyanatophenyl)propane, bis(2,5-dimethyl - 4 - isocyanatophenyl)methane, cyclohexyl-bis(4-isocyanatophenyl)methane, bis(3 - methoxy - 4 - isocyanatophenyl)methane, bis(4 - methoxy - 3 - isocyanatophenyl)methane, bis(2 - methyl - 5-methoxy-4-isocyanatophenyl)methane, 2,2 - bis(3-chloro-4-isocyanatophenyl)propane, 2,2'-diisocyanatobenzophenone, 2,4-diisocyanatodibenzyl, p-nitrophenyl - bis(4-isocyanatophenyl)methane, phenyl-bis(2,5-dimethyl - 4 - isocyanatophenyl)methane, 2,7-diisocyanatofluorene, 2,6 - diisocyanatophenanthroquinone, 3,6-diisocyanato - 9-ethylcarbazole, 3,8-diisocyanatopyrene, 2,8-diisocyanatochrysene, 2,4-dissocyantodiphenylsulfide, bis(4-isocyanatophenyl)sulfide, bis(4 - isocyanatophenyl)sulfone, bis(4 - isocyanatobenzyl)sulfone, and 2,4'-diisocyanato-4-methyldiphenylsulfone.

The oligomers obtained by the reaction of the above described ester-diol with diisocyanate are isocyanate terminated ester-diol polyurethanes. Although the molecular weight of the preferred ester diol polyurethane oligomers is about 1,000 to about 5000 obtained by using a mole ratio of diisocyanate to ester-diol of from about 2/1 to about 15/14, this range is not narrowly critical.

The preferred organic dibasic acids used in the instant invention are cyclic acids (aromatic or alicyclic) such as phthalic, isophthalic, tetrahydrophthalic, hexahydrophthalic, and the like, although other dibasic acids, as for example aliphatic acids such as adipic, azelaic or sebacic and the like, can be used if desired.

The second type of oligomer diol is prepared by first reacting the ester-diol with a dibasic acid in about a 2/1 mole ratio and then analyzing the product, a long-chain diol, for hydroxyl content. The hydroxyl content is used to calculate the amount of diisocyanate needed to react with this product to afford an isocyanate-terminated ester diol/polyester/urethane oligomer.

The preferred vinyl chloride copolymers are those which contain at least 80 percent vinyl chloride and from 4 to 20 percent vinyl acetate copolymerized therein. It is particularly preferred to use commercially available vinyl chloride copolymers (solid) such as those containing from about 85 to 88 percent vinyl chloride and 12 to 15 percent vinyl acetate. Other vinyl chloride copolymers which can be used in the practice of this invention include vinyl chloride-vinyl propionate, vinyl chloride-vinyl butyrate, vinyl chloride-vinylidene chloride, vinyl chloride-vinylidene fluoride, and the like.

The invention is further described in the examples which follow in which all parts and percentages are by weight unless otherwise specified.

Example 1.—Preparation of an ester-diol polyurethane

Into a 1 liter 3-necked flask equipped with a mechanical stirrer, reflux condenser and thermometer all dried in a 100° C. oven prior to use was weighed the following charge:

| | Grams |
|---|---|
| Ester diol (0.75 mole) | 153.0 |
| Methylisobutyl ketone | 100.3 |
| Tolylene diisocyanate (0.85 mole) | 147.9 |

The reactants were heated at 130° C. for 1 hour at which time a sample was removed for the determination of isocyanate content. A value of 0.53 meq./g. (milliequivalents of hydroxyl per gram of sample) was obtained at this time, the theoretical end point being 0.50 meq./g. Heating for an additional hour decreased the isocyanate content to 0.48 meq./g. showing the low tendency of isocyanate to further react with urethane under these conditions. At a 75 percent non-volatile content, the polyurethane solution was extremely viscous when cooled to room temperature. Additional methylisobutyl ketone was added to reduce the solids concentration to 60 percent ester-diol polyurethane.

Example 2

Example 1 was repeated with the exception that the reaction temperature was maintained between 100 and 110° C. The condensation required about 6 hours to complete. An ester diol polyurethane similar to that obtained in Example 1 resulted.

Example 3.—Preparation of an ester-diol/polyester

Into a 2 liter flask equipped with a stirrer, thermometer, and Dean-Stark trap plus reflux condenser was weighed 415 grams (2.50 mole) of isophthalic acid and 1020 grams (5.00 moles) of ester diol. The reactants were heated to 200° C. with xylene added to maintain the reflux temperature at 200°C. and facilitate the removal of water. The bulk of the by-product water was removed during the first 6 hours of reaction. The reaction was completed by refluxing overnight. The product solution having a solids content of 95.2 percent was a liquid of moderate viscosity which analyzed 0.075 meq./g. carboxyl and 2.94 meq./g. hydroxyl. This end group analysis corresponds to a molecular weight of about 647.

Example 4

Example 3 was repeated with the exception that 2 moles of ester diol was esterified with 1 mole phthalic anhydride. The end group analysis of this product, namely 0.004 milliequivalents of carboxyl per gram and 3.06 milliequivalents of hydroxyl per gram, indicated a molecular weight of 653.

Example 5.—Preparation of ester-diol/polyester/urethane oligomer

Into a 1 liter flask equipped with a stirrer, thermometer and reflux condenser was placed 357 grams of the 95.2 percent solids ester solution obtained from Example 3, 135.3 grams of toluene, and 117.4 grams (0.675 mole) of tolylene diisocyanate. The reactants were heated rapidly to 110° C. and maintained there for 1 hour. Analysis showed 0.56 meq./g. of residual isocyanate. Heating was continued at 110° until a total reaction time of 2 hours and 50 minutes was obtained. Analysis then showed the residual isocyanate value as 0.49 meq./g. The product ester diol/polyester/urethane oligomer was obtained upon cooling as a 75 percent solid solution. The isocyanate analysis indicates that the oligomer has a molecular weight of about 3,000.

Example 6.—Compatibility of oligomers with vinyl chloride/vinyl acetate copolymer The compatibility of a commercially available vinyl chloride/vinyl acetate copolymer (87/13, intrinsic viscosity-0.53 at 30° C. in cyclohexanone) with the oligomers described above was determined by blending a 20 percent stock solution of the vinyl chloride/vinyl acetate copolymer (in 1/1 toluene/methylisobutyl ketone) with the high solids oligomer solutions in Examples 1, 2 and 5. In the range of 90:10 to 60:40, oligomer: vinyl chloride/vinyl acetate copolymer, all mixtures were found to be compatible.

The various blends were used to coat steel and wood panels and left to cure at ambient temperature and ambient humidity. In all cases, the cured coatings were compatible. Both the ester-diol polyurethane and the ester-diol polyester-urethane combinations with the vinyl resin showed lacquer-like dry in that they were sufficiently dry to handle upon evaporation of the bulk of the solvent. After 24 hours, they had developed much of the toughness of the final coating.

Although the invention has been described in its preferred form with a certain degree of particularity, it is understood that the present disclosure of the preferred forms has been only by way of example and that numerous changes in details may be resorted to without departing from the spirit and the scope of the claimed invention,

What is claimed is:
1. A one-package, self-curing coating composition comprising:
(a) 90 to 60 percent by weight of an isocyanate terminated oligomer reaction product of (1) a hydroxyl terminated oligomer of an ester diol having the formula

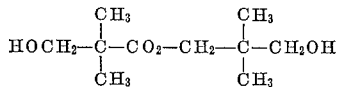

copolymerized with an organic dibasic acid comonomer capable of condensation polymerization with said ester diol, and (2) a diisocyanate; and
(b) about 10 to 40 percent by weight of a normally solid copolymer of vinyl chloride and a vinyl ester containing at least about 80 percent by weight based on the weight of copolymer of vinyl chloride copolymerized therein.

2. A one-package, self-curing coating composition comprising:
(a) about 90 to 60 percent by weight of an isocyanate terminated oligomer condensation reaction product of (1) an ester diol having the formula

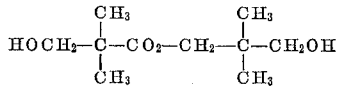

(2) a diisocyanate; and
(b) about 10 to 40 percent by weight of a normally solid copolymer of vinyl chloride and the vinyl ester containing at least about 80 percent by weight based on the weight of copolymer of vinyl chloride copolymerized therein.

3. The coating composition claimed in claim 1 wherein the range of isocyanate terminated oligomer is about 80 to 70 percent by weight and the range of vinyl chloride copolymer is about 20 to 30 percent by weight.

4. The coating composition claimed in claim 2 wherein the isocyanate terminated oligomer is in the range from about 80 to 70 percent and the range of vinyl chloride copolymer is about 20 to 30 percent by weight.

5. The coating composition claimed in claim 1 wherein the number-average molecular weight of the isocyanate-terminated oligomer is about 1000 to 5000.

6. The coating composition claimed in claim 2 wherein the isocyanate-terminated oligomer number-average molecular weight is about 1000 to 5000.

7. The coating composition claimed in claim 1 wherein the organic dibasic acid is an aromatic dibasic acid.

8. The coating composition claimed in claim 7 wherein the aromatic dibasic acid is isophthalic acid.

9. The coating composition claimed in claim 1 wherein the diisocyanate is tolylene diisocyanate.

10. The composition claimed in claim 2 wherein the diisocyanate is tolylene diisocyanate.

11. The composition claimed in claim 1 wherein the vinyl chloride copolymer contains about 80 to 88 percent vinyl chloride copolymerized therein.

12. The coating composition claimed in claim 2 wherein the vinyl chloride copolymer contains about 80 to 88 percent vinyl chloride copolymerized therein.

13. Method of preparing a one-package, self-curing, isocyanate-terminated oligomer coating composition which comprises:
(1) preparing an hydroxyl-terminated oligomer by the condensation of an ester diol having the formula:

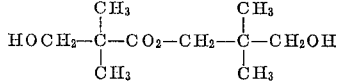

with an organic dibasic acid;
(2) condensing said hydroxyl-terminated oligomer with a molar excess of a diisocyanate until an isocyanate-terminated oligomer condensation product is formed; and
(3) blending about 90 to 60 parts by weight of said isocyanate-terminated oligomer condensation product with about 10 to 40 parts by weight of a normally solid copolymer of vinyl chloride and a vinyl ester containing at least about 80 percent by weight, based on the weight of copolymer, or vinyl chloride copolymerized therein.

14. Method claimed in claim 13 wherein the organic dibasic acid is isophthalic acid.

15. Method claimed in claim 13 wherein the diisocyanate is tolylene diisocyanate.

16. An article comprising a coated substrate comprising said substrate and coated thereon a cured composition of claim 1.

17. A coated article comprising a substrate and coated on said substrate the cured composition of claim 2.

References Cited

UNITED STATES PATENTS 3,000,947    9/1961    Martin _____ 260—31.6

SAMUEL H. BLECH, Primary Examiner

PAUL LIEBERMAN, Assistant Examiner

U.S. Cl. X.R.

117—132, 148; 260—32.8, 33.6, 75, 77.5

PO-1050
(5/69)

UNITED STATES PATENT OFFICE
CERTIFICATE OF CORRECTION

Patent No. 3,467,731       Dated September 16, 1969

Inventor(s) John Wynstra

It is certified that error appears in the above-identified patent and that said Letters Patent are hereby corrected as shown below:

The title should read -- VINYL COATING COMPOSITIONS OF POLYVINYL CHLORIDE WITH ISOCYANATE TERMINATED OLIGOMER OF 2,2-DIMETHYL-1,3-PROPANEDIOL MONO(HYDROXYPIVALATE) --.

SIGNED AND
SEALED
FEB 24 1970

(SEAL)
Attest:

Edward M. Fletcher, Jr.
Attesting Officer

WILLIAM E. SCHUYLER, JR.
Commissioner of Patents